United States Patent [19]

Brandstätter

[11] Patent Number: 4,625,709
[45] Date of Patent: Dec. 2, 1986

[54] TRACKING SOLAR COLLECTOR INSTALLATION

[76] Inventor: Rolf Brandstätter, Spesshardter Weg 22, D-7260 Calw, Fed. Rep. of Germany

[21] Appl. No.: 741,732

[22] Filed: Jun. 5, 1985

[30] Foreign Application Priority Data

Jun. 8, 1984 [DE] Fed. Rep. of Germany ....... 3421411

[51] Int. Cl.$^4$ .............................................. F24J 2/38
[52] U.S. Cl. .................... 126/424; 126/417; 126/438; 353/3
[58] Field of Search ............... 126/417, 424, 425, 438, 126/439, 451; 353/3; 248/521, 522, 538, 131, 420

[56] References Cited

U.S. PATENT DOCUMENTS

| Re. 25,242 | 9/1962 | Toulmin, Jr. | 353/3 |
| 1,632,254 | 6/1927 | Vinogrado | 353/3 |
| 1,705,988 | 3/1929 | Maxwell | 126/438 X |
| 4,158,356 | 6/1979 | Wininger | 126/425 |
| 4,233,958 | 11/1980 | Heden | 126/424 |
| 4,247,182 | 1/1981 | Smith | 353/3 |
| 4,295,621 | 10/1981 | Siryj | 353/3 X |

Primary Examiner—Larry Jones
Attorney, Agent, or Firm—Balogh, Osann, Kramer, Dvorak, Genova & Traub

[57] ABSTRACT

A plate provided with solar collectors is carried by a mast, which rests on a top member which defines the top of a liquid-filled chamber, which has a variable volume. When an outlet nozzle of the chamber is opened, the weight of the mast compresses a bellows, which defines the chamber. As a result, the mast descends and is rotated at the same time because a radial pin slides in a helical groove or slot formed in the tube.

11 Claims, 5 Drawing Figures 4,625,709

TRACKING SOLAR COLLECTOR INSTALLATION

BACKGROUND OF THE INVENTION

1. Field of the Invention

This invention relates to a tracking solar collector installation comprising a mast and a solar collector plate carried by the mast.

2. Description of the Prior Art

Solar collector installations are known which comprise a solar collector plate and tracking means for imparting horizontal and, if desired, vertical sun tracking movements to the plate. The tracking means comprise electric motors for moving the plate. The electric motors are controlled by light sensors so that the plate is always adjusted to exactly face the sun.

Solar collectors which are thus caused to track the sun generate 40 to 45% more energy than fixed solar collectors, e.g., collectors mounted on southern roof surfaces.

But such electric tracking means are easily deranged and are expensive and consume part of the recovered energy for the tracking operation.

SUMMARY OF THE INVENTION

It is an object of the invention to provide a solar collector installation with means for tracking the sun without a consumption of electric power.

In a solar collector installation of the kind described first hereinbefore that object is accomplished in accordance with the invention in that a vertical tube is provided, which encloses a volume-variable, liquid-filled chamber having an outlet, and extends around the mast, which carries the solar collector plate and stands on the top cover of the chamber, one of the elements consisting of the vertical tube and the mast is provided with a helical track and the other of the elements is provided with at least one track follower pin, which extends into and is slidable along said track.

Under the pressure which is due to the weight of the mast standing on the top of the chamber, the volume of the chamber is continuously decreased because the liquid is displaced from the chamber into the vertical tube through the outlet of the chamber and is collected in a vessel that is provided in the vertical tube. As the mast descends, it closes the inlet opening through which liquid can be admitted to the chamber.

As the mast descends in the vertical tube and reduces the volume of the chamber, the pin is displaced along the helical track so as to rotate the mast.

The helical track suitably extends over an angle of 180° about the axis of the vertical tube. The pitch of the helical track, the diameter of the outlet of the chamber, the viscosity of the liquid, the weight of the mast and the spring force tending to expand the chamber should be so selected that the mast is rotated through 180° in about 12 hours. The vertical tube may be arranged in such an orientation that the lower end of the helical track faces east in the morning. In that case the collector plate, which is pivoted on the mast for rotation on a horizontal axis, will track the apparent path traversed by the sun during a day.

By measurements it has been found that the energy gain which can be achieved by a sensor-controlled tracking will be obtained even when the collector does not track the sun as closely as, e.g., an astronomical telescope. For an adequate adaptation to the elevation of the sun, it is sufficient to adjust the inclination of the collector plate by hand a few times during a year.

The mast of the installation in accordance with the invention will have descended to a predetermined position in the evening. To ensure that it will move along the helical track again, the mast must be raised to the position in which the collector plate faces the sun in the next morning. This is accomplished by means of a handle, which is secured to the mast. As the mast is raised by means of the handle, the inlet opening communicating with the supply vessel is exposed so that liquid is sucked from the vessel into the chamber as the latter is expanded by spring force. The chamber may preferably be defined by a bellows integrally provided with a compression spring. Alternatively, the chamber may be defined by a cylinder, in which a spring-biased piston is slidably mounted.

It is desired to ensure that the collector plate will face south when it has been forgotten to start the tracking means. For this purpose the helical track extends over an angle of 180° and is succeeded by an oppositely handed helical track extending over an angle of 90°. As a result, the mast continues to descend after its rotation from east to west and will be turned back and will be arrested with the collector plate facing south.

The clip for fixing the handle to the mast is provided with a depending sleeve, which surrounds the vertical tube adjacent to the helical tracks.

In large tracking solar collector installations embodying the invention, particularly in mobile installations, the mast may be so heavy that it cannot be raised by hand. For this reason it is a further aspect of the invention to provide for a hydraulic raising of the mast. In that case the chamber is not provided with a compression spring and the liquid is pumped by means of a hand-operated pump from a supply vessel through valves into the chamber so that the liquid raises the mast and causes it to rotate at the same time. As the weight of the mast applies pressure to the liquid in the chamber, the latter is forced out of the chamber through a throttle valve into the supply vessel so that the volume of the chamber is decreased. The duration of the descent of the mast can be exactly adjusted by means of the throttle valve.

DETAILED DESCRIPTION OF THE PREFERRED EMBODIMENTS

Figure 1:
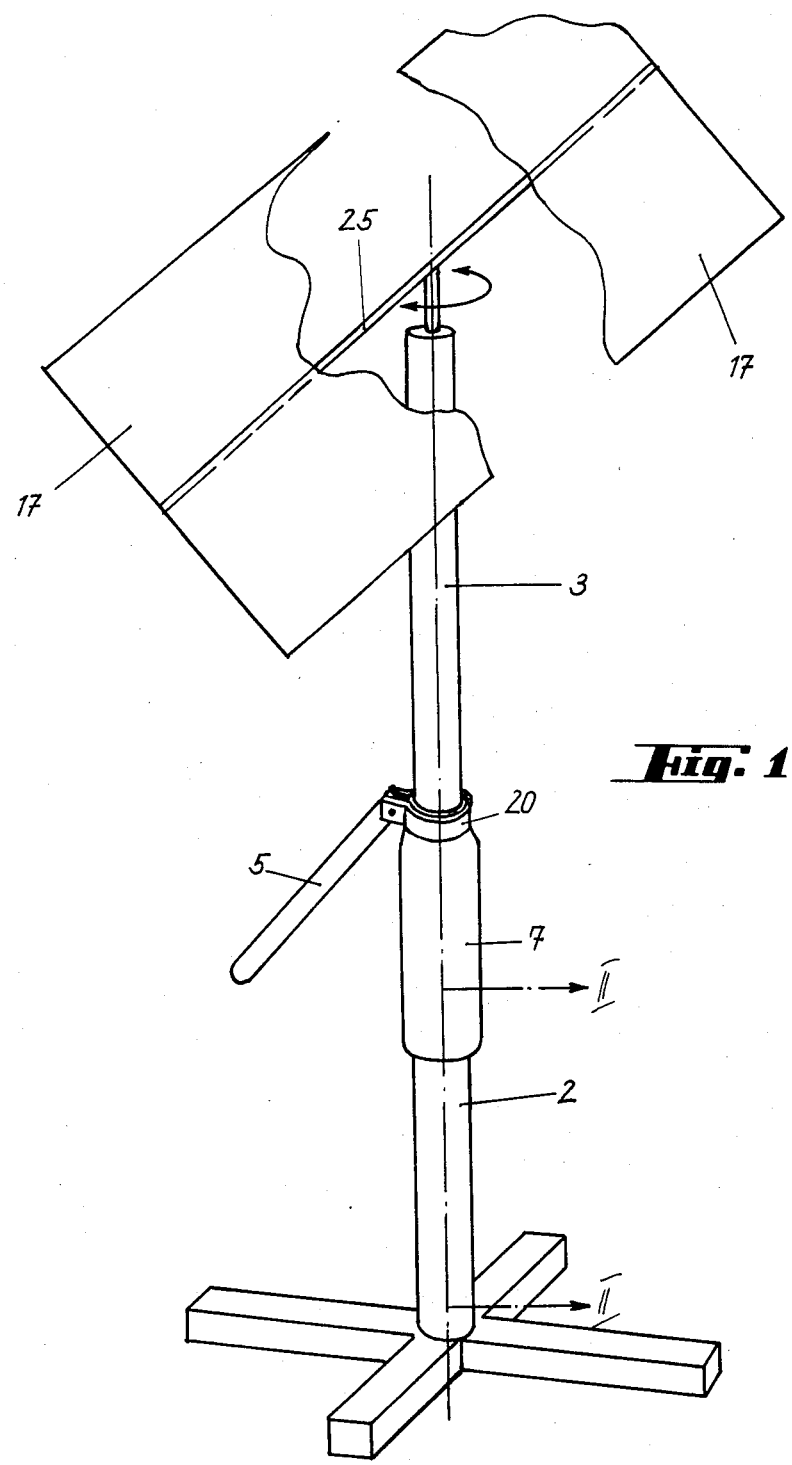
FIG. 1 is a perspective view showing an embodiment of the invention.

Two embodiments of a tracking solar collecting installation in accordance with the invention are diagrammatically shown, partly in section, on the drawing.

The installation shown in the drawing comprises a vertical tube 2 and a mast 3. The latter carries a collector plate 17, which is pivotally adjustable by hand about a horizontal axis, not shown. Two spacers 4 and 4' are provided between the vertical tube 2 and the mast 3 and hold said two members radially spaced apart.

Figure 2:
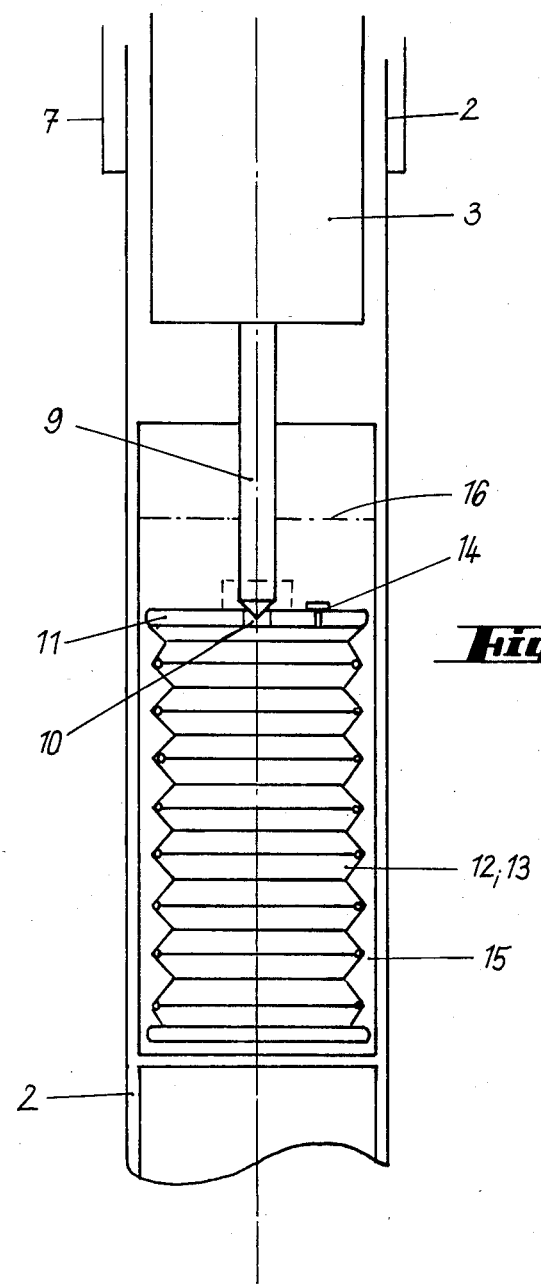
FIG. 2 is a longitudinal sectional view taken on line II—II in FIG. 1.
Figure 3:
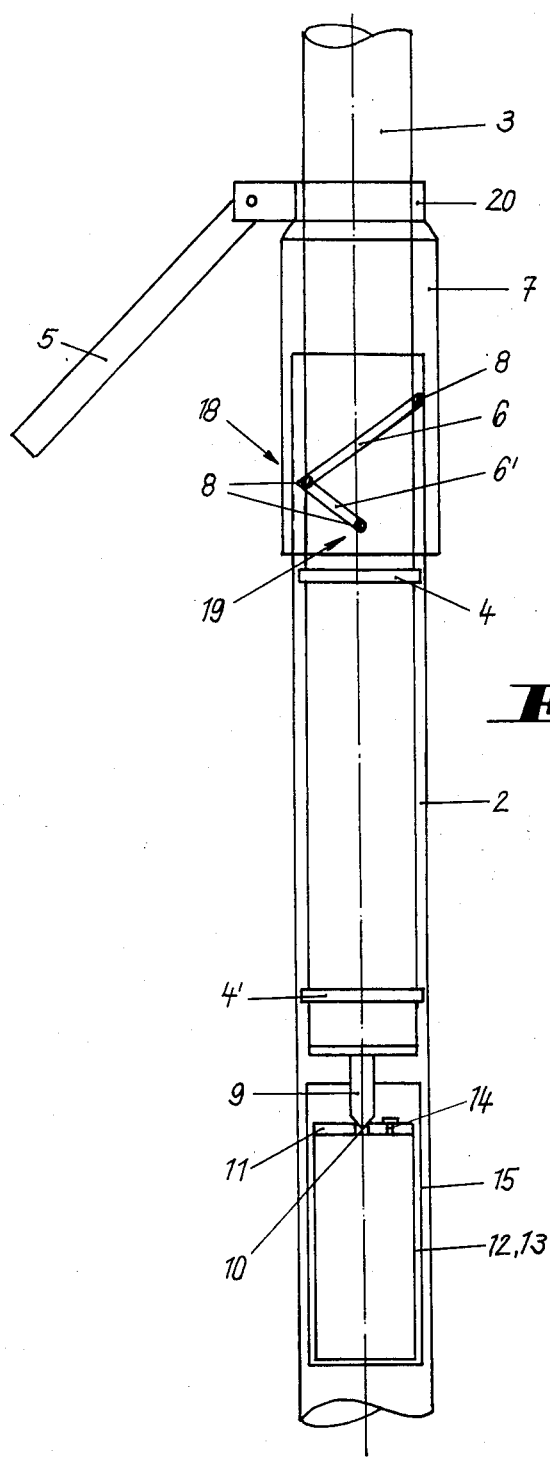
FIG. 3 is a longitudinal sectional view showing the lower part of FIG. 2 with more details.

In the embodiment shown in FIGS. 1 to 3, the vertical tube 2 contains in its lower portion a supply vessel 15, which contains a vertical bellows comprising an integrated compression spring 13 and defining in its interior a chamber 12. The bellows stands on the bottom of the vessel 15, which is filled with liquid approximately to the level indicated by the line 16. The bellows is provided with a top 11, which is formed with an inlet opening 10 and an outlet nozzle 14.

The mast 3 carries a depending rod 9, which closes the inlet opening 10 as the bellows is axially compressed by the weight of the mast 3. As a result, liquid contained in the bellows is forced through the nozzle 14 into the vessel 15.

A track follower pin 8 protrudes radially from the mast 3 and is guided by a helical track formed by a groove 6 in the inside surface of the vertical tube. At the beginning of the descent of the mast (in the morning), the pin 8 is in the position shown. During the descent of the mast 3, it is rotated through 180° from east via south to west as the pin 8 slides in the helical groove 6. In the evening, the pin 8 is in the position 18 and then enters the oppositely handed helical track groove 6', which succeeds the helical groove 6. As a result, the mast 3 continues to descend and is rotated through 90° in the opposite direction and will be arrested when the pin 8 moving along the groove 6' has reached the position 19 so that the collector plate 17 faces south.

By means of the handle 5, the mast 3 can be moved to any desired elevation. The handle 5 is fixed by means of a clip 20, on which a sleeve 7 is mounted, which surrounds the tube 2 adjacent to the helical grooves 6 and 6'.

Figure 4:
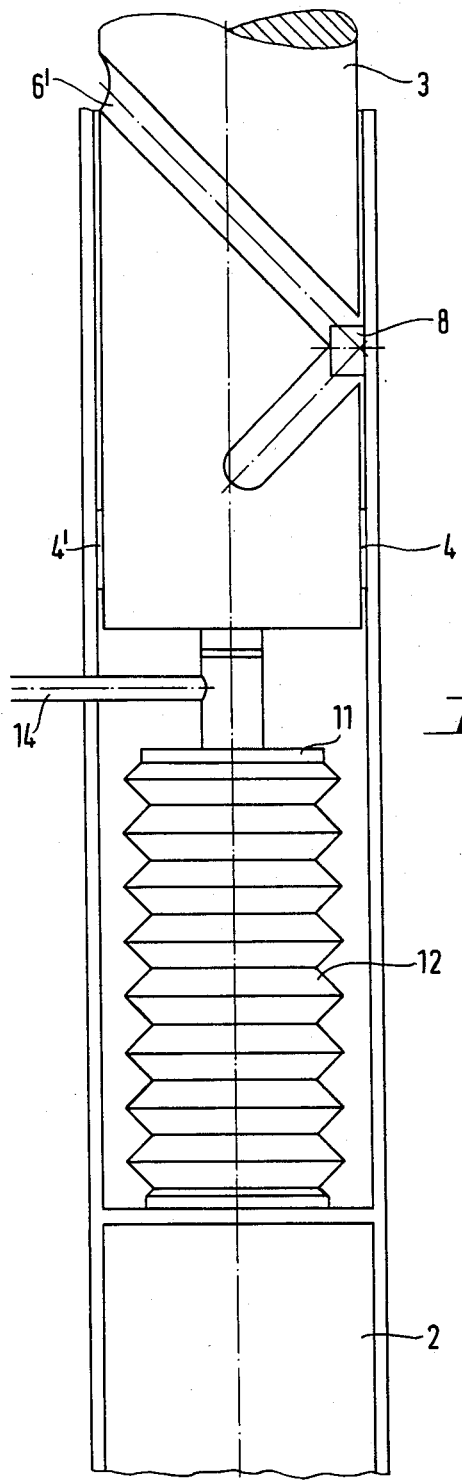
FIG. 4 is a diagrammatic view showing in elevation the second embodiment comprising hydraulic means for raising the mast and FIG. 5 is a hydraulic circuit diagram for the embodiment shown in FIG. 4.
Figure 5:
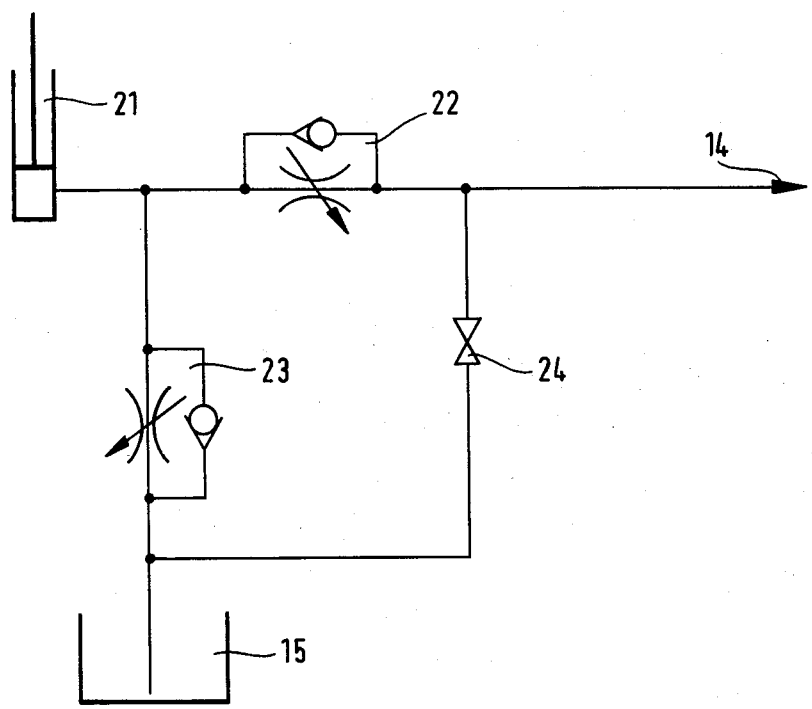

In the embodiment shown in FIGS. 4 and 5 the handle 5, the clip 20 and the compression spring 13 have been omitted and the supply vessel 15 is disposed outside the vertical tube 2.

In this embodiment the liquid is pumped from the supply vessel 15 to the chamber 12 in the bellows by means of a manually operated pump 21 through the valves 22 and 23 to raise the amst 3 and to rotate the same. To permit the mast 3 to descend with a reverse rotation, the throttle valve 24 is opened so that the liquid flows back from the chamber 12 to the supply vessel 15.

In a further embodiment, the valve 22 and 23 are combined throttle and check valves. Liquid is sucked into the pump 21 through the valve 23 and is forced by the pump through the valve 22 into the chamber 12. The valves 22 and 23 act as check valves during the operation of the pump and as throttle valves during the descent of the mast. A valve 24 can be opened to permit a rapid discharge of liquid from the chamber 12 so that the mast 3 descends quickly.

It will be understood that the helical tracks 6, 6' may consist of slots rather than grooves and that the track follower pin 8 may be provided on the tube 2 and the tracks 6, 6' in the mast 3.

I claim:

1. In a tracking solar collector installation comprising
   a mast having a lower end portion,
   a solar collector plate mounted on said mast and rotatable about a vertical axis, and
   tracking means for rotating said solar collector plate about said vertical axis,
   the improvement residing in that said tracking means comprise
   a vertical tube, surrounding said lower portion of said mast, which protrudes above said tube,
   chamber defining means in the form of a bellows with a top member slidable in said tube to change the volume of said chamber a compression spring tending to expand said bellows along said axis,
   means for admitting liquid to said chamber and for discharging liquid at a controlled rate from said chamber,
   a reservoir is provided, which is adapted to receive liquid from and to supply liquid to said internal chamber,
   a helical track centered on said axis and provided on one of the elements consisting of said mast and said tube on the side thereof facing the other of said elements, and
   at least one track follower provided on the other of said elements and engageable with and adapted to ride along said track,
   so that said mast is adapted to force down said top member and to displace liquid out of said chamber at a controlled rate,
   said track follower and said track are arranged to cooperate and to rotate said mast about said axis in response to an axial movement of said top member, and
   said solar collector plate is non-rotatably connected to said mast.

2. The improvement set forth in claim 1, wherein said vertical tube is spaced around the lower end portion of said mast.

3. The improvement set forth in claim 1, wherein said helical track is a helical groove.

4. The improvement set forth in claim 1, wherein said helical track is a helical slot.

5. The improvement set forth in claim 1, wherein said at least one track follower comprises at least one track follower pin in sliding engagement with said helical track.

6. Improvement set forth in claim 1, wherein
   said means for admitting liquid to and for discharging liquid from said chamber comprise a constricted outlet formed in said top member and an inlet formed in said top member.
   said mast comprises a depending rod which is engageable with said top member at said inlet so as to seal the same,
   said mast is adapted to be raised so as to lift said rod from said inlet, and
   said inlet and outlet communicate with a reservoir for receiving liquid from said chamber through said outlet and for delivering liquid to said chamber through said inlet.

7. The improvement set forth in claim 1, wherein said helical track extends over an angle of 180° around said vertical axis.

8. The improvement set forth in claim 1, wherein
   said helical track is succeeded at its lower end by an additional helical track extending over an angle of 90° about said vertical axis and
   said helical tracks are mutually oppositely handed.

9. The improvement set forth in claim 1, wherein a handle is secured to said mast and arranged to be disposed above said tube when said mast is in its lowermost position in said tube.

10. The improvement set forth in claim 9, wherein said helical track consists of a helical slot formed in said tube,
said handle is secured to said mast by a clip and
said clip is connected to a sleeve, which surrounds said vertical tube and covers said helical track.

11. The improvement set forth in claim 1, wherein said means for admitting liquid to and for discharging liquid from said chamber comprises two combined throttle and check valves for controlling the flow of liquid between said reservoir and said chamber and a manually operable pump for supplying liquid from said reservoir through said valves to said chamber, and said valves are arranged to act as throttle valves as liquid is forced out of said chamber by said mast and as check valves as liquid is supplied from said reservoir to said internal chamber by an actuation of said pump.

* * * * *